United States Patent Office 2,712,018
Patented June 28, 1955

2,712,018

METHOD OF RECOVERING OPIUM ALKALOIDS FROM OPIUM

Philipp Zutavern, Heidelberg, Adolf Gempp, Saeckingen in Baden, and Werner Mothes, Ludwigshafen (Rhine), Germany, assignors to Knoll A.-G. Chemische Fabriken, Ludwigshafen (Rhine), Germany, a corporation of Germany No Drawing. Application July 17, 1951, Serial No. 237,286. In France September 1, 1948

Public Law 619, August 23, 1954
Patent expires September 1, 1968

18 Claims. (Cl. 260—285)

This invention relates to an improvement in the method of recovering opium alkaloids from opium, and more particularly to an improved method of separating morphine from the non-morphine opium alkaloids narcotine, papaverine, thebaine, codeine, and other alkaloids.

The known methods of recovering alkaloids from opium and of separating and isolating morphine from non-morphine opium alkaloids are rather complicated. One of the more outstanding shortcomings of said methods is that they require large amounts of solvents. The losses incurred in the recovery of said solvents are rather high and therefore render the known processes uneconomical. Furthermore, a great number of process steps are necessary in order to produce a morphine substantially free of said other opium alkaloids.

One object of the present invention consists in providing a simple method of quantitatively recovering the alkaloids from opium without the use of large amounts of expensive volatile solvents.

Another object of this invention consists in providing a method of separating morphine from the other opium alkaloids in a simple manner requiring only a few process steps and yielding morphine in a purity and with a yield which have not been attained heretofore.

Other objects of this invention will become apparent from this specification.

According to this invention opium is thoroughly extracted by means of liquid anhydrous sulfur dioxide. Morphine is substantially insoluble in liquid sulfur dioxide and therefore remains in the extraction residue while the non-morphine opium alkaloids are quantitatively, in the dissolved condition, dissolved therein and remain in the extract. Morphine, on the other hand, is quantitatively recovered from the opium extraction residue by extracting said residue, for instance, with acid containing solvents and by precipitating morphine from the extracts obtained thereby by means of ammonia or other alkaline agents.

Commercial opium has usually a water content of 12–15%. According to this invention the opium must first be freed of its water content before it is extracted with sulfur dioxide. Many means are available and many methods may be used to free the opium of its water content. It may be done by direct heat drying, by mixing with water absorbing or water binding agents and in any other suitable manner. Drying is preferably carried out by reducing the opium to small particles, arranging such particles in thin layers on trays, and heating said particles in a vacuum at about 60° C. until there is no further loss of weight.

Another suitable way of reducing the water content, avoiding thereby a separate drying step, consists in thoroughly mixing the opium with agents capable of combining with water, such as with anhydrous sodium sulfate, dehydrated gypsum and others. The opium is thereby converted into a non-sticky dry mass and may be very readily comminuted to a fine powder rendering it especially suitable for extraction with sulfur dioxide.

Another modification of this process step of the invention consists in first intimately mixing the starting material with dry calcium hydroxide in an amount up to about 50% of the weight of the opium. A powerful mixer is used for mixing the opium with the calcium hydroxide. In order to finely divide said mixture, it is then forced through an extrustion machine to form short sections of small diameter. These sections, either directly or after further drying, may be very readily ground to a powder.

The sulfur dioxide extraction of opium free of its water content according to this invention is carried out in a suitable extraction apparatus, preferably in a closed extraction apparatus operating according to the Soxhlet principle. Before charging said apparatus with liquid sulfur dioxide it is advisable to evacuate the apparatus in order to eliminate atmospheric humidity. Sulfur dioxide extraction is continued until substantially all of the alkaloids soluble in sulfur dioxide are extracted.

The extraction residue remaining after the sulfur dioxide extract has been removed, is worked up to recover therefrom the morphine. This may be done, for instance, by extracting said residue with water or with acid containing solvents and isolating morphine from the resulting extract, for instance, by precipitation with ammonia or other alkaline agents. Prior to precipitation of the morphine, any calcium compound present in the extraction residue may be precipitated, for instance, by means of oxalic acid whereby the insoluble calcium oxalate is formed and is removed.

Any amounts of morphine which were not precipitated by the addition of ammonia or other alkaline agents and which remain in the mother liquors, may be recovered therefrom by extraction with suitable solvents. An especially suitable solvent is a mixture of butanol and benzene, preferably in the proportion of between 40 to 60 parts of butanol and between 60 to 40 parts of benzene. However, other solvents may be employed likewise.

The sulfur dioxide extract contains the non-morphinic opium alkaloids, papaverine, thebaine, codeine, narcotine and others, in quantitative yield and free of other inactive substances, such as gums and resins. Such non-morphinic opium alkaloids may be recovered from the sulfur dioxide extract and may be separated from each other by known methods.

The following examples serve to illustrate the invention without, however, limiting the same to them.

*Example 1*

20 kg. of opium with a morphine content of 2.550 kg., corresponding to 12.75% (analysis according to the method of Harrison) are cut into slices of 5 mm. thickness. These slices are dried in a vacuum at about 60° C. for three days. The loss of water amounts to 3.070 kg., i. e. to 15.4%. The dried material is ground to a coarse powder in a rough-grinding mill, the powder is introduced into the extraction apparatus and is thoroughly extracted by means of liquid anhydrous sulfur dioxide. The extraction may be carried out by repeatedly treating the ground material with liquid anhydrous sulfur dioxide in an open container whereby evaporation of the sulfur dioxide is prevented by cooling, or by a treatment in a closed Soxhlet apparatus under a pressure of 2 atmospheres over atmospheric pressure. The sulfur dioxide is removed from the extract by heating. The resulting residue represents a light-brown, porous, readily pulverizable mass of 6.003 kg. It contains the non-morphinic opium alkaloids.

The extracted opium residue is freed of adhering sulfur dioxide by vacuum evaporation. It is boiled several times with methanol containing 3–5% of hydrochloric acid. The methanolic extracts are evaporated to remove the methanol, the residue is dissolved in 10,000 cc. of water (70° C.), an excess of calcium hydroxide (750 g.) is added to said solution, the mixture is filtered, 850 g. of sodium carbonate are added to the filtrate which is then heated to about 60° C. whereby calcium carbonate is precipitated. The precipitate is filtered off, the filtrate is acidified to a pH of 3.0 by adding 2,000 cc. of concentrated hydrochloric acid, and is then rendered alkaline by the addition of 850 g. of sodium carbonate until the pH is 9.0. The greater part of the morphine precipitates thereby. It is filtered off. The filtrate is three times extracted by shaking with a butanol-benzene mixture containing about 50 parts of butanol and about 50 parts of benzene. The butanol-benzene extracts are shaken with 300 cc. of 2% sulfuric acid and thereafter three times with water. Further amounts of morphine are precipitated from the sulfuric acid solution by the addition of 15 g. of sodium carbonate. The combined morphine precipitates thus obtained of technical purity, after drying, have a weight of 2.747 kg. and a melting point of 241-243° C.

*Example 2*

10 kg. of opium are cut into small pieces and are mixed with 1.2 kg. of anhydrous sodium sulfate by adding said salts in small portions to the opium. Instead of anhydrous sodium sulfate 6 kg. of dehydrated gypsum may be used. Heat is generated during such admixture of sodium sulfate or gypsum. In order to avoid an increase in temperature above 50° C. during mixing, it is advisable to use a mixing apparatus which can be cooled. The mixture is thoroughly kneaded until a non-sticky, crumbly mass is obtained. Said mass is passed through a granulating device to produce a coarse grit-like material. As soon as the water content of the opium is completely combined with the sodium sulfate or dehydrated gypsum, the granular material is introduced into an extraction apparatus and is extracted with liquid anhydrous sulfur dioxide. After extraction is completed the sulfur dioxide extract is separated from the extraction residue. The extract may be worked up to non-morphine alkaloids while the residue yields, according to the method described in Example 1, pure morphine in a very good yield.

It is advisable, before subjecting the opium-sodium sulfate mixture or the opium-gypsum mixture to sulfur dioxide extraction, to add anhydrous sodium carbonate, calcium hydroxide or another known basic agent capable of releasing the opium alkaloid bases from their combination in which they are present in the opium. Thus, for instance, 10 kg. of opium are mixed with 1.2 kg. of anhydrous sodium sulfate and 2 kg. of sodium carbonate or, in place of the sodium carbonate, 1.8 kg. of calcium hydroxide. The mixture is then worked up and extracted with sulfur dioxide as described above. In place of sodium sulfate or gypsum, other agents may be used which are capable of combining with water.

*Example 3*

500 g. of a mixture of opium with 18% of calcium hydroxide by weight are extracted, without drying, with liquid anhydrous sulfur dioxide. The extract, after evaporation of the sulfur dioxide, yields a tough residue containing the non-morphinic opium alkaloids. Said residue is worked up in a manner known per se or according to Example 5 to said non-morphinic opium alkaloids.

The extracted opium residue is freed of remaining sulfur dioxide by heating and is extracted with 2,500 cc. of water. The brownish-yellow clear extract is acidified with 140 g. of oxalic acid, the calcium oxalate precipitate is separated and 25 cc. of 25% ammonia are added to the filtrate. The precipitate is filtered off and dried yielding 45.3 g. of morphine of the melting point of 254° C. The filtrate therefrom is extracted with 300 cc. of a mixture of butanol and benzene containing 50 parts of butanol and 50 parts of benzene. After evaporating the solvents from said extract, an additional 7.7 g. of morphine of about the melting point of 250° C. are obtained. Total yield: 53 g. of morphine corresponding to 100% of the theoretical yield (calculated for an analytically determined morphine content, of the opium, of 12.88%).

*Example 4*

500 g. of opium are intimately mixed with 18% of calcium hydroxide by weight and are then dried in a drying oven at about 60° C. until there is no further loss of weight. Said mixture is extracted with anhydrous liquid sulfur dioxide. After separating the extract from the extraction residue and removing the sulfur dioxide from said extract by evaporation, 104 g. of a brownish-colored partly crystalline, pulverizable mass are obtained. The non-morphinic opium alkaloids present therein are recovered and separated from each other as described in Example 5.

One liter of water is added to the extracted opium residue, the pH of the mixture is adjusted to 9.0 by the addition of 20 g. of calcium hydroxide, the calcium compound is precipitated by the addition of 30 g. of oxalic acid to the solution, the calcium oxalate is filtered off, and morphine is precipitated from the filtrate by the addition of 50 cc. of 25% of ammonia. After filtering and drying 56.53 g. of morphine of the melting point of 254° C. are obtained. The ammoniacal mother liquor is extracted by means of a butanol-benzene mixture containing 50 parts of butanol and 50 parts of benzene. The extract, after evaporation of the solvent, yields 7.33 g. of morphine of about the melting point of 250° C. Total yield: 107.4% since the morphine content of the opium used as starting material was calculated to 59.43 g. according to analysis. The variance between the calculated amount of morphine and the actual yield is probably due to unsatisfactory results obtained by the conventional methods of analysis of morphine.

*Example 5*

450 g. of an opium granulate containing by weight 15% of calcium hydroxide are extracted with liquid anhydrous sulfur dioxide. The extract is evaporated to remove the sulfur dioxide. 96.5 g. of a residue containing the non-morphinic alkaloids of opium are obtained. The alkaloids are intimately triturated with 500 g. of fine sand, mixed with sawdust and extracted in an extraction apparatus with 10,000 cc. of a 10% aqueous solution of sulfur dioxide by weight at a pH 2.0 in the cold for 24 hours. An excess of ammonia (300 cc. of 25% NH₃) is added to the light brown, clear extract obtained and the solution is then shaken out several times with ether. The combined ether extracts are dried over sodium sulfate and the ether is evaporated by distillation. 33.738 g. of a mixture of bases are obtained thereby. The aqueous solution remaining after ether extraction is shaken several times with chloroform whereby further 4.433 g. of a mixture of bases are obtained producing a total yield of 38.171 g. of the non-morphinic opium alkaloids.

In order to separate the narcotine from said mixture of bases, the mixture is dissolved in benzene while heating, the undissolved bases are filtered off, and the filtrate is allowed to cool. Thereby part of the narcotine crystallizes and is filtered off. By concentration of the benzene mother liquor by evaporation, further amounts of narcotine are recovered. Total yield: 15.65 g. corresponding to 4.16% of the opium.

To recover the papaverine, the concentrated benzene extracts from the narcotine crystallization are evaporated to dryness and the residue is taken up with 15 cc. of a 25% solution of oxalic acid in alcohol. On allowing the solution to stand for some time, 4.36 g. of papaverine bioxalate crystallize out.

The mother liquor of papaverine bioxalate is neutralized with 5 cc. of 25% ammonia and 1.8 g. of tartaric acid are added to said neutralized solution causing 4.329 g. of thebaine bitartrate to crystallize out after allowing the mixture to stand for some time. The thebaine bitartrate corresponds to 2.92 g. of thebaine base, i. e. to 0.92% of the opium.

The neutralizing of the mother liquor of papaverine bioxalate, also, can be carried out with alkaline hydroxide, alkaline carbonate, ammonia.

To isolate the codeine, the mother liquor from the thebaine crystallization is rendered alkaline by the addition of 3 g. of sodium hydroxide and is then extracted with chloroform. The chloroform extract is dried and neutralized with 5.3 cc. of 10% sulfuric acid. Thereby 2.145 g. of codeine sulfate crystallize out corresponding to 1.616 g. of codeine base, i. e. to 0.55% of the opium.

The morphine is recovered from the opium-calcium hydroxide extraction residue in the same manner as described, for instance, in Example 4.

In the foregoing examples, there is disclosed the use of ammonia and sodium carbonate for the precipitation of morphine from its aqueous and acid solutions. Other suitable precipitating agents are potassium carbonate and ammonia carbonate which when used to an excess will precipitate the morphine from its solutions. The examples further disclose the use of methanol, containing hydrochloric acid, or the use of water for dissolving morphine from the sulfur dioxide extraction residue. In place of such solvents, ethanol may be used. Also, the extracted opium can be triturated with sodium carbonate in addition of some water, then dried and extracted with methanol or ethanol of lower or raised temperature.

The examples further disclose the use or application of anhydrous sodium sulfate and the use of dehydrated gypsum as agents capable of combining with water present in the opium. In place of sodium sulfate and gypsum, other agents capable of combining with such water may be utilized such as members of the group which comprises water binding means of neutral reaction; examples whereof are represented by silicagel, tragacanth. The examples disclose as a suitable solvent a mixture of butanol and benzene in carrying out the step of extraction of morphine from alkaline aqueous mother liquors. In place thereof, other mixtures of water-immiscible alcohols and aromatic hydrocarbons such as a mixture of chloroform and isopropyl alcohol, methyl cyclohexanol may be utilized in the same proportions as the butanol benzene mixture. It is possible to use in the place of such solvent mixtures any other water-immiscible solvent capable of dissolving morphine, such as, for instance, amyl alcohol.

In carrying out the step of isolating and precipitating papaverine, thebaine and codeine, the examples disclose the use of benzene or chloroform as solvents and oxalic acid, tartaric acid, or sulfuric acid as precipitating agents. Additional suitable solvents for the latter step are ethylene chloride, methylene chloride, and additional precipitating agents are, instead of oxalic acid adipic acid, and instead of sulphuric acid hydrobromic acid.

Of course, many changes and variations in the reaction conditions, the amounts of agents capable of combining with water, and of calcium hydroxide added to the opium, the methods of working up the sulfur dioxide extracts and the extraction residue, and the like may be made by those skilled in the art in accordance with the principles set forth herein and in the claims annexed hereto.

We claim:

1. In a method of recovering opium alkaloids from opium by extracting the non-morphine opium alkaloids by means of liquid sulfur dioxide, separating the extract obtained thereby from the residue, and isolating morphine from said residue, the steps comprising mixing opium with a water binding agent to produce a mixture substantially completely free of uncombined water and extracting said mixture with sulfur dioxide.

2. In a method of recovering opium alkaloids from opium according to claim 1, wherein the water-binding agent is anhydrous calcium sulfate.

3. In a method of recovering opium alkaloids from opium by extracting the non-morphine opium alkaloids by means of liquid sulfur dioxide, separating the extract obtained thereby from the residue, and isolating morphine from said residue, the steps comprising mixing opium with a water-binding agent, heating said mixture to an elevated temperature not exceeding about 60° C., to produce a mixture substantially completely free of uncombined water, and extracting said mixture with sulfur dioxide.

4. In a method of recovering opium alkaloids from opium according to claim 3, whereby heating of the mixture of opium and water binding agent is carried out in a vacuum.

5. In a method of recovering opium alkaloids from opium according to claim 1, wherein the water-binding agent is anhydrous sodium sulfate.

6. In a method of recovering opium alkaloids from opium according to claim 1, wherein the water-binding agent is dry calcium hydroxide.

7. In a method of recovering opium alkaloids from opium according to claim 3, wherein opium is freed of its water content by mixing the same with dry calcium hydroxide and drying said mixture at a temperature not in excess of about 60° C. to remove the water present in said opium-calcium hydroxide mixture.

8. In a method of recovering opium alkaloids from opium, the steps comprising mixing opium with anhydrous sodium sulfate, to bind the water present in said opium, extracting said mixture with liquid sulfur dioxide, separating the sulfur dioxide extract containing the non-morphinic opium alkaloids, from the extraction residue, extracting said extraction residue with methanol containing hydrochloric acid, evaporating the resulting extract to dryness, dissolving the residue in water, adding to said aqueous solution an excess of calcium hydroxide, precipitating from the filtrate thereof calcium carbonate, by the addition of sodium carbonate, removing said calcium carbonate, acidifying the filtrate to a pH of about 3.0, rendering the acid solution alkaline to a pH of about 9, and removing the morphine precipitated thereby.

9. In a method of recovering opium alkaloids from opium, the steps comprising mixing opium with anhydrous sodium sulfate, to bind the water present in said opium, extracting said mixture with liquid sulfur dioxide, separating the sulfur dioxide extract containing the non-morphinic opium alkaloids from the extraction residue, extracting said extraction residue with methanol containing hydrochloric acid, evaporating the resulting extract to dryness, dissolving the residue in water, adding to said aqueous solution an excess of calcium hydroxide, precipitating from the filtrate thereof calcium carbonate, by the addition of sodium carbonate, removing said calcium carbonate, acidifying the filtrate to a pH of about 3.0, rendering the acid solution alkaline to a pH of about 9, removing the morphine precipitated thereby, extracting the mother liquors therefrom with a mixture of butanol and benzene, shaking said butanol-benzene extracts with dilute sulfuric acid, and precipitating further amounts of morphine from the resulting sulfuric acid extract by the addition of sodium carbonate.

10. In a method of recovering opium alkaloids from opium, the steps comprising mixing opium with dry calcium hydroxide, drying said mixture at a temperature not in excess of about 60° C. to completely remove the water present in said mixture, extracting said dried mixture with liquid sulfur dioxide, separating the sulfur dioxide extract from the extraction residue, extracting said extraction residue with water, precipitating the calcium compound present in said extract and precipitating morphine from the resulting filtrate by the addition of ammonia.

11. In a method of recovering opium alkaloids from opium, the steps comprising mixing opium with dry calcium hydroxide, drying said mixture at a temperature not in excess of about 60° C. to completely remove the water present in said mixture, extracting said dried mixture with liquid sulfur dioxide, separating the sulfur dioxide extract from the extraction residue, extracting said extraction residue with water, precipitating the calcium compound present in said extract, precipitating morphine from the resulting filtrate by the addition of ammonia, removing the morphine precipitated thereby, extracting the mother liquors therefrom with a mixture of butanol and benzene, shaking said butanol-benzene extracts with dilute sulfuric acid, and precipitating further amounts of morphine from the resulting sulfuric acid extract by the addition of sodium carbonate.

12. In a method of recovering opium alkaloids from opium, the steps comprising extracting opium free of its water content, with liquid sulfur dioxide, separating the sulfur dioxide extract from the extraction residue, evaporating sulfur dioxide from the sulfur dioxide extract, extracting the resulting residue with a dilute aqueous acid solution, adding an excess of ammonia to said extract, extracting the non-morphinic opium alkaloids from said aqueous ammoniacal extract with a water-immiscible solvent, separating said solvent extract, evaporating said solvent therefrom, extracting the evaporation residue with benzene, allowing narcotine to crystallize out of said benzene solution, evaporating the benzene mother liquors, dissolving the evaporation residue in an alcoholic solution of oxalic acid, allowing papaverine bioxalate to crystallize out of said alcoholic solution, neutralizing the alcoholic mother liquors, precipitating thebaine bitartrate by the addition of tartaric acid, rendering alkaline the mother liquors obtained on filtering off the thebaine bitartrate, extracting said alkaline mother liquors with chloroform, neutralizing said chloroform extract with sulfuric acid, and allowing codeine sulfate to crystallize out.

13. In a method of recovering opium alkaloids from opium by extracting the non-morphine opium alkaloids by means of a solvent, separating the extract obtained thereby from non-extracted residue, and isolating morphine from said extraction residue, the steps comprising using opium which has been freed of its water content, as opium material to be extracted, and liquid sulfur dioxide as solvent for said non-morphine opium alkaloids.

14. In a method of recovering opium alkaloids from opium according to claim 13, wherein opium is freed of its water content by drying at a temperature not in excess of about 60° C.

15. In a method of recovering opium alkaloids from opium by extracting the non-morphine opium alkaloids by means of a solvent, separating the extract obtained thereby from non-extracted residue, and isolating morphine from said extraction residue, the steps comprising using opium which has been freed of its water content, as opium material to be extracted, and liquid sulfur dioxide as solvent for said non-morphine opium alkaloids, and isolating morphine from said extraction residue by extraction with an acid containing solvent.

16. In a method of recovering opium alkaloids from opium by extracting the non-morphine opium alkaloids by means of a solvent, separating the extract obtained thereby from non-extracted residue, and isolating morphine from said extraction residue, the steps comprising using opium which has been freed of its water content, as opium material to be extracted, and liquid sulfur dioxide as solvent for said non-morphine opium alkaloids, and isolating morphine from said extraction residue by extraction with an acid containing solvent.

17. In a method of recovering opium alkaloids from opium, the steps comprising extracting opium free of its water content, with liquid sulfur dioxide, separating the sulfur dioxide extract, containing the non-morphinic opium alkaloids, from the extraction residue, extracting said extraction residue with methanol containing hydrochloric acid, evaporating the resulting extract to dryness, dissolving the residue in water, adding to said aqueous solution an excess of calcium hydroxide, precipitating from the filtrate thereof calcium carbonate by the addition of sodium carbonate, removing said calcium carbonate, acidifying the filtrate to a pH of about 3.0, rendering the acid solution alkaline to a pH of about 9.0, and removing the morphine precipitated thereby.

18. In a method of recovering opium alkaloids from opium, the steps comprising extracting opium free of its water content, with liquid sulfur dioxide, separating the sulfur dioxide extract, containing the non-morphinic opium alkaloids, from the extraction residue, extracting said extraction residue with methanol containing hydrochloric acid, evaporating the resulting extract to dryness, dissolving the residue in water, adding to said aqueous solution an excess of calcium hydroxide, precipitating from the filtrate thereof calcium carbonate by the addition of sodium carbonate, removing said calcium carbonate, acidifying the filtrate to a pH of about 3.0, rendering the acid solution alkaline to a pH of about 9.0, removing the morphine precipitated thereby, extracting the mother liquors therefrom with a mixture of butanol and benzene, shaking said butanol-benzene extracts with dilute sulfuric acid, and precipitating further amounts of morphine from the sulfuric acid extract by the addition of sodium carbonate.

References Cited in the file of this patent

FOREIGN PATENTS 1,015,463     France _____ July 23, 1952

OTHER REFERENCES

Chem. Abst., vol. 42, pp. 1023 and 1024 (1948).